US009168865B2

(12) United States Patent
Nakamura

(10) Patent No.: US 9,168,865 B2
(45) Date of Patent: Oct. 27, 2015

(54) ORGANIC ELECTRO-LUMINESCENCE LIGHTING DEVICE FOR VEHICLE

(75) Inventor: Hiroshi Nakamura, Yokohama (JP)

(73) Assignees: Hyundai Motor Company, Seoul (KR); Kia Motors Corporation, Seoul (KR); Hyundai Motor Japan R&D Center, Inc., Yokohama (JP)

(*) Notice: Subject to any disclaimer, the term of this patent is extended or adjusted under 35 U.S.C. 154(b) by 508 days.

(21) Appl. No.: 13/561,405

(22) Filed: Jul. 30, 2012

(65) Prior Publication Data
US 2013/0088147 A1 Apr. 11, 2013

(30) Foreign Application Priority Data

Oct. 11, 2011 (KR) ........................ 10-2011-0103711

(51) Int. Cl.
B60Q 1/14 (2006.01)
B60Q 3/02 (2006.01)
(52) U.S. Cl.
CPC ............ *B60Q 3/0283* (2013.01); *B60Q 3/0293* (2013.01); *B60Q 3/0296* (2013.01)
(58) Field of Classification Search
CPC ....... B60Q 3/02; B60Q 3/0283; B60Q 3/0293
USPC .............................................. 315/77, 80, 312
See application file for complete search history.

(56) References Cited

U.S. PATENT DOCUMENTS

| 6,464,381 | B2 * | 10/2002 | Anderson et al. ............. 362/488 |
| 7,445,350 | B2 * | 11/2008 | Konet et al. .................... 362/84 |
| 7,750,352 | B2 * | 7/2010 | Thurk .............................. 257/79 |
| 2007/0068786 | A1 * | 3/2007 | Hein ............................. 200/510 |

FOREIGN PATENT DOCUMENTS

| JP | 2006518076 A | 8/2006 |
| JP | 2007264200 A | 10/2007 |
| KR | 10-2005-0117350 | 12/2005 |
| KR | 10-2010-0058314 | 6/2010 |
| KR | 10-2010-0092975 | 8/2010 |
| KR | 20-2010-0012916 | 12/2010 |
| WO | 2004072843 A1 | 8/2004 |
| WO | 2011007325 A1 | 1/2011 |

* cited by examiner

Primary Examiner — Jeffrey Zweizig
(74) Attorney, Agent, or Firm — Mintz Levin Cohn Ferris Glovsky and Popeo, P.C.; Peter F. Corless

(57) ABSTRACT

An organic EL lighting device for a vehicle is provided, which includes an organic EL lighting portion provided in a matrix form on a ceiling of the vehicle, an organic EL touch portion provided on the organic EL lighting portion, an organic EL detection portion for detecting a position in which the organic EL touch portion is touched, an organic EL determination portion for determining a lighting area of the organic EL lighting portion based on the position detected by the organic EL detection portion, and an organic EL driving portion for lighting the lighting area of the organic EL lighting portion determined by the organic EL determination portion.

5 Claims, 5 Drawing Sheets

ORGANIC ELECTRO-LUMINESCENCE LIGHTING DEVICE FOR VEHICLE

CROSS-REFERENCE TO RELATED APPLICATION

This application is based on and claims priority from Korean Patent Application No.10-2011-0103711, filed on Oct. 11, 2011 in the Korean Intellectual Property Office, the disclosure of which is incorporated herein in its entirety by reference.

BACKGROUND OF THE INVENTION

1. Field of the invention

The present invention relates to an organic EL (Electro-Luminescence) lighting device for a vehicle, and more particularly, to an organic EL lighting device for a vehicle which can adjust a lighting area and a light distribution intensity using a film type organic EL panel.

2. Description of the Prior Art In general, in the center of a headlining of a vehicle, a lamp for lighting the vehicle interior is installed.

The lamp includes a housing fixed to the headlining, two bulbs fixedly installed in the housing, and a lens covering the bulbs. When the lamp is turned on, light emitted from the lamp is distributed throughout the interior of the vehicle.

However, since the lamp in the related art is fixed to the center of the headlining, the intensity of the light varies depending on distance from the lamp, with intense light being limited to only certain locations within the vehicle. Further, the intensity of the light distribution from such lamps cannot be adjusted. Thus, there are problems in that a driver or a passenger must move closer to the lamp for adequate lighting, which is inconvenient.

SUMMARY OF THE INVENTION

Accordingly, the present invention has been made to solve the above-mentioned problems occurring in the prior art while advantages achieved by the prior art are maintained intact.

In particular, the present invention provides an organic EL lighting device for a vehicle which can adjust the area that is illuminated and which can further adjust light distribution intensity by using an organic EL light emitting portion that is composed of organic EL elements.

In one aspect of the present invention, there is provided an organic EL lighting device for a vehicle, which includes an organic EL lighting portion provided in a matrix form on a ceiling of the vehicle; an organic EL touch portion provided on the organic EL lighting portion; an organic EL detection portion for detecting a position in which the organic EL touch portion is touched; an organic EL determination portion for determining a lighting area of the organic EL lighting portion through the position detected by the organic EL detection portion; and an organic EL driving portion for lighting the lighting area of the organic EL lighting portion as determined by the organic EL determination portion.

According to the present invention, since the organic EL lighting device is installed on the ceiling of the vehicle and the lighting area and the light distribution intensity can be adjusted by to user as desired, the convenience of using the lighting device and its efficiency are increased, and the merchantability of the vehicle is improved.

BRIEF DESCRIPTION OF THE DRAWINGS

The above and other objects, features and advantages of the present invention will be more apparent from the following detailed description taken in conjunction with the accompanying drawings, which are given hereinbelow by way of illustration only, and thus are not limitative of the present invention, in which.

Figure 1:
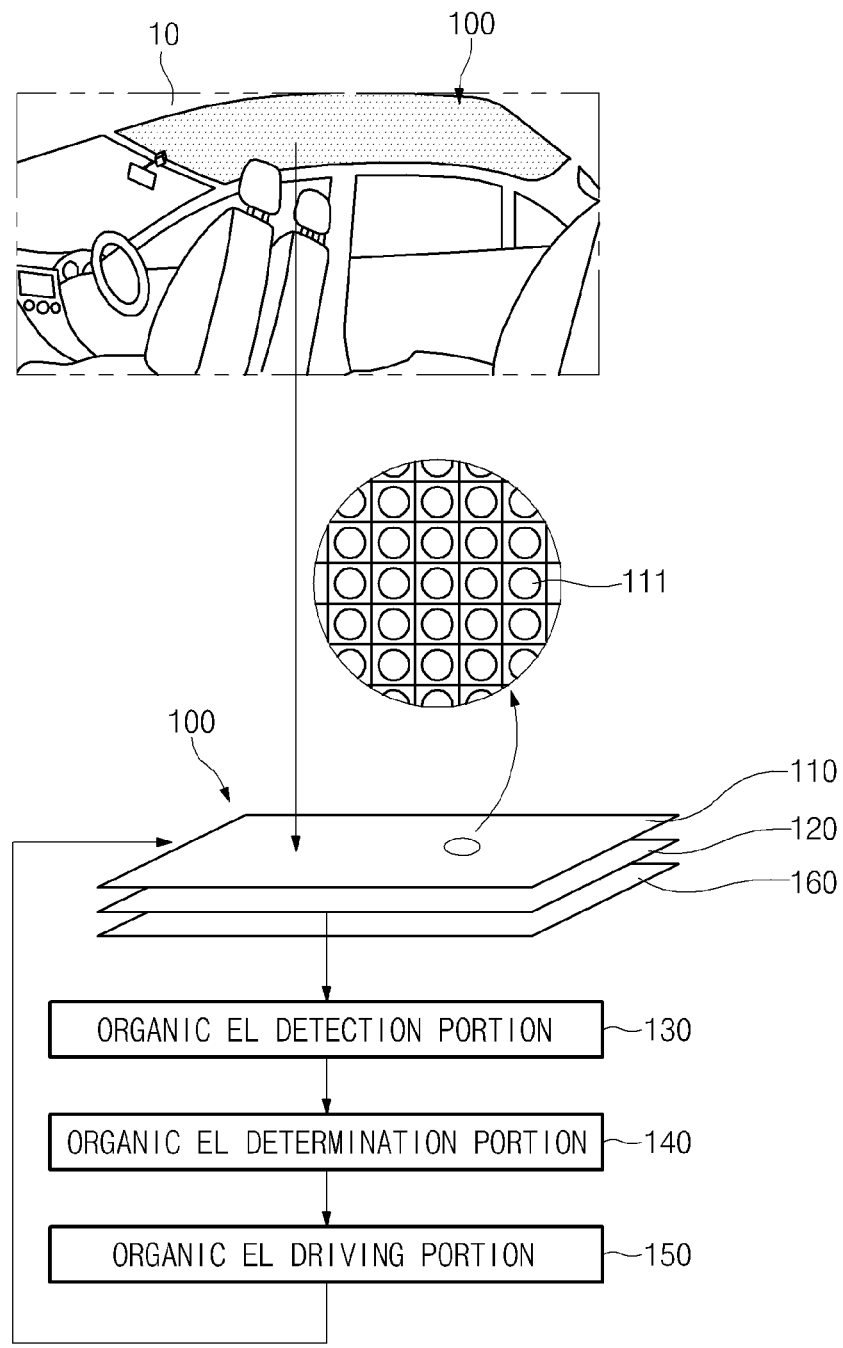
FIG. 1 is a view illustrating an organic EL lighting device for a vehicle according to a first embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

An organic EL lighting device for a vehicle according to a first embodiment of the present invention includes an organic EL lighting portion provided in a matrix form on a ceiling of the vehicle; an organic EL touch portion provided on the organic EL lighting portion; an organic EL detection portion for detecting a position in which the organic EL touch portion is touched; an organic EL determination portion for determining a lighting area of the organic EL lighting portion through the position detected by the organic EL detection portion; and an organic EL driving portion for lighting the lighting area of the organic EL lighting portion as determined by the organic EL determination portion.

Further, an organic EL lighting device for a vehicle according to a second embodiment of the present invention includes an organic EL lighting portion arranged in a matrix form on a ceiling of the vehicle; an organic EL photographing portion provided on one side of the interior of the vehicle and configured to photograph a position in which the organic EL lighting portion is touched; an organic EL detection portion for detecting a touch position of the organic EL lighting portion that is photographed by the organic EL photographing portion; an organic EL determination portion for determining a lighting area through the position detected by the organic EL detection portion; and an organic EL driving portion for lighting the lighting area as determined by the organic EL determination portion.

According to these embodiments, a transparent protection sheet can be provided on a surface of the organic EL touch portion.

According to embodiments of the invention, the organic EL lighting portion is composed of a plurality of organic EL elements arranged in a matrix form.

The plurality of organic EL elements can include one of a variety of colored EL elements which emit corresponding color lights. For example, the plurality of organic EL elements can include one of blue, red, green, and yellow organic EL elements, which emit corresponding color lights, respectively, to form a monochromatic light source. In some embodiments, the plurality of organic EL elements can include two or more colored EL elements which form a polychromatic light source. For example, the plurality of organic EL elements can include two or more of blue, red, green, and yellow organic EL elements to form a polychromatic light source.

Hereinafter, a preferred embodiment of the present invention will be described with reference to the accompanying drawings. The matters defined in the description, such as the detailed construction and elements, are merely specific details provided with respect to the preferred embodiments so as to assist those of ordinary skill in the art in a comprehensive understanding of the invention, and thus the present invention is not limited thereto.

An organic EL lighting device 100 for a vehicle according to the first embodiment of the present invention, as illustrated in FIG. 1, is configured such that if a user touches an organic EL lighting portion 110 that is arranged in the form of a film on a ceiling 10 of the vehicle with his/her finger, a partitioned lighting area emits light, and a lighting area and a light distribution intensity can be conveniently adjusted as desired by the user.

As described above, and as shown in FIG. 1, the organic EL lighting device 100 for a vehicle according to a first embodiment of the present invention includes an organic EL lighting portion 110 provided in a matrix form on a ceiling 10 of the vehicle, and an organic EL touch portion 120 provided on one surface of the organic EL lighting portion 110. The EL lighting device 100 further includes an organic EL detection portion 130 for detecting a position in which the organic EL touch portion 120 is touched, an organic EL determination portion 140 for determining a lighting area of the organic EL lighting portion 110 based on the position detected by the organic EL detection portion 130, and an organic EL driving portion 150 for lighting the lighting area of the organic EL lighting portion 110 as determined by the organic EL determination portion 140.

In this embodiment, the organic EL lighting portion 110 is composed of a plurality of organic EL elements 111 arranged in a matrix form to provide an organic EL panel. This organic EL panel can be prepared as a flexible film type of panel so that it can be installed to correspond to the curved surface shape of the ceiling 10 of the vehicle.

In this embodiment, the plurality of organic EL elements can include one of various colored EL elements, such as, for example, one of blue, red, green, and yellow organic EL elements, which emit corresponding color lights, respectively, to form a monochromatic light source. Alternatively, the plurality of organic EL elements can include two or more various colored EL elements, such as, for example, two or more of blue, red, green, and yellow organic EL elements to form a polychromatic light source. Accordingly, diverse lighting colors can be obtained.

According to embodiments of the present invention, the organic EL lighting portion 110 that is composed of the organic EL elements 111 is also called a self-emitting display device that requires no backlight, and the respective organic EL elements that perform organic EL lighting can be provided with parasitic capacitors that are arranged in parallel. The parasitic capacitors have very large parasitic capacitance with respect to current flowing through the organic EL elements 111.

That is, by selectively supplying driving current to the selected organic EL elements, the lighting area of the organic EL lighting portion 110 can be adjusted.

In this embodiment, the organic EL touch portion 120, which is configured to select the lighting position of the organic EL lighting portion 110, is formed on the bottom surface of the organic EL lighting portion 110, and is composed of a touch panel.

In this embodiment, the organic El detection portion 130 detects a touch position (i.e. the position that a user's finger or other tool comes into contact with) of the organic EL touch portion 120. That is, the organic EL detection portion 130 detects the touch position that corresponds to an area measured from a start point of the organic EL touch portion 120 to an end point thereof.

In this embodiment, the organic EL determination portion 140 partitions the lighting area through the determination of the touch position that is detected by the organic EL detection unit 130. That is, the organic EL lighting portion 110 determines the lighting area based on the area that extends from the start point to the end point of the touch position as detected by the organic EL detection unit 130.

Here, if the start point and the end point of the touch position are not continuously detected by the organic EL detection portion 130, the lighting area is determined by the shortest distance between the start point and the end point of the touch position.

In this embodiment, the organic EL driving portion 150 supplies a driving current to the EL elements that are positioned in the lighting area of the organic EL lighting portion as determined by the organic EL determination portion 140.

As further shown in FIG. 1, a transparent protection sheet 160 can be provided on the surface of the organic EL touch portion 120 for protecting the organic EL touch portion 120 and the organic El lighting portion 110. As such, the protection sheet can greatly extend the use period of the organic EL touch portion and the organic EL light portion 110.

Hereinafter, a method of lighting an organic EL lighting device for a vehicle having the above-described configuration will be described with reference to FIGS. 2A to 2D.

Figure 2A:
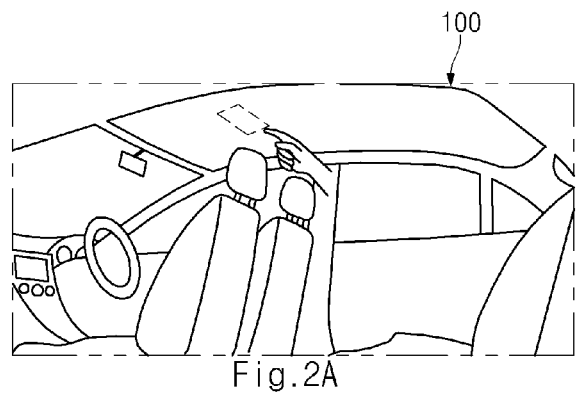
FIGS. 2A to 2D are views illustrating an organic EL lighting device for a vehicle in a first use state according to the first embodiment of the present invention.

First, a passenger uses his/her finger or a tool to touch and draw a shape on the organic EL touch portion 120 (FIG. 2A).

Then, the position of the shape which is drawn by the passenger's finger or the tool is detected by the organic EL detection portion 130, and is then transferred to the organic EL determination portion 140. The organic EL determination portion 140 determines the lighting area of the organic EL lighting portion 110 by correcting or adjusting the drawn shape so that the drawn shape is in a closed state or form.

Figure 2B:
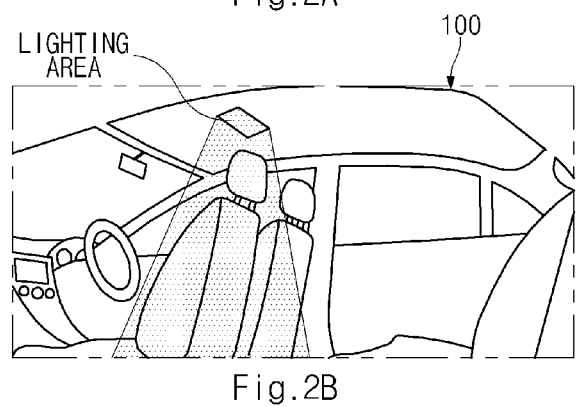
Figure 2C:
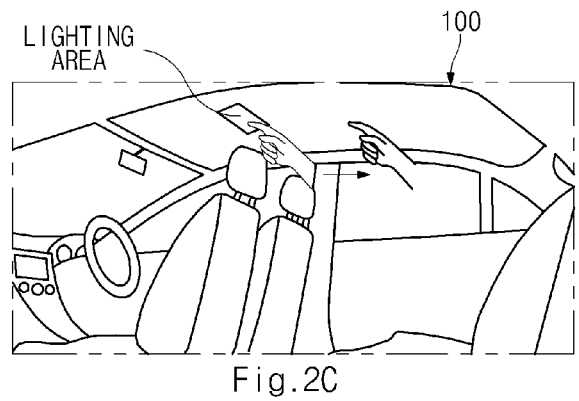

If the lighting area is determined by the organic EL determination portion 140, then the organic EL driving portion 150 makes the EL elements emit lights in the determined lighting area by supplying the driving current to the EL elements (FIG. 2B).

In this case, if the passenger desires to change the lighting area, he/she moves his/her finger or tool in a state where his/her finger is in contact with the organic EL touch portion 120 in the lighting area (FIG. 2C), and the organic EL detection portion 130 detects the changed touch position and transfers the detected touch position to the organic EL determination portion 140. Accordingly, the organic EL determination portion 140 re-determines the lighting area of the organic EL lighting portion 110 based on the changed touch position.

Figure 2D:
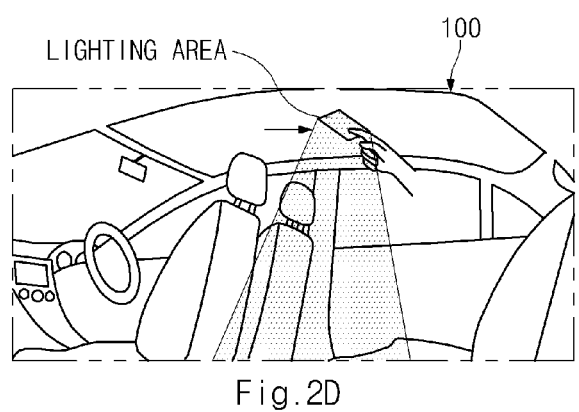
Figure 3A:
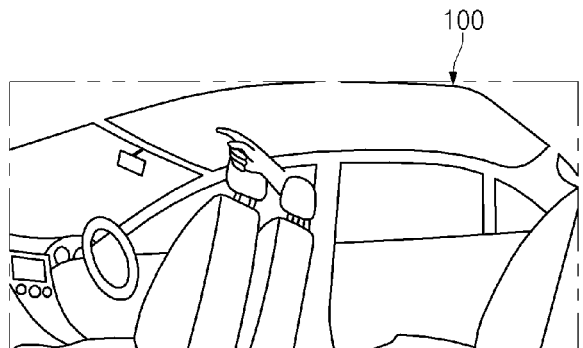
FIGS. 3A to 3D are views illustrating an organic EL lighting device for a vehicle in a second use state according to the first embodiment of the present invention.
Figure 3B:
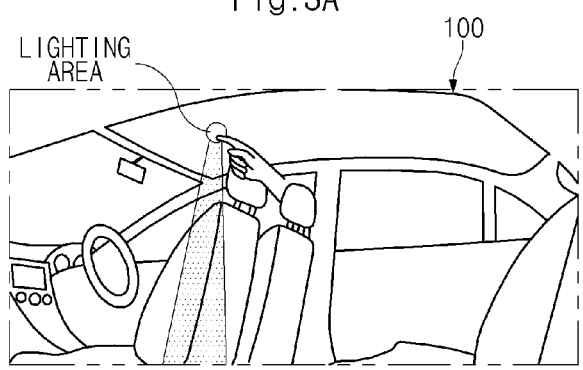
Figure 3C:
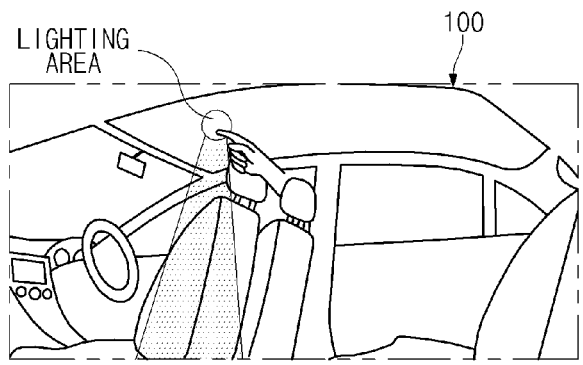
Figure 3D:
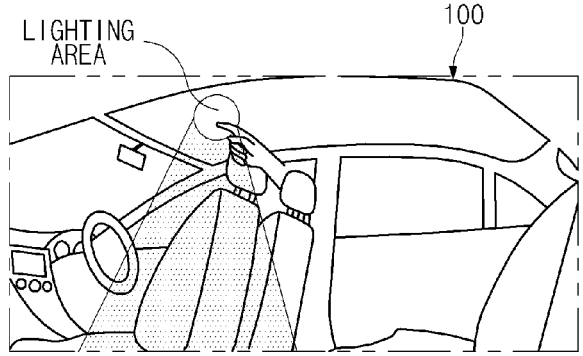

Next, if the lighting area is determined by the organic EL determination portion 130, the organic EL driving portion 140 makes the EL elements emit lights in the determined lighting area by supplying the driving current to the EL elements. As a result, the lighting position can be easily changed (FIG. 2D).

On the other hand, using the above-described method, as illustrated in FIGS. 3A to 3D, the lighting area of the organic EL lighting portion 110 can be increased by extending the area of the organic EL touch portion 120, or the light distribution intensity can be adjusted.

Figure 4A:
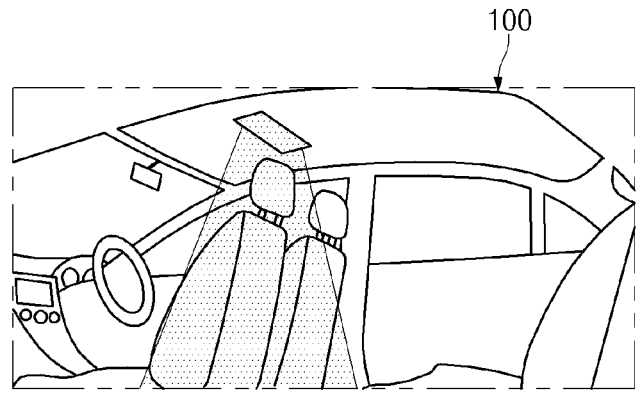
FIGS. 4A to 4C are views illustrating an organic EL lighting device for a vehicle in a third use state according to the first embodiment of the present invention.
Figure 4B:
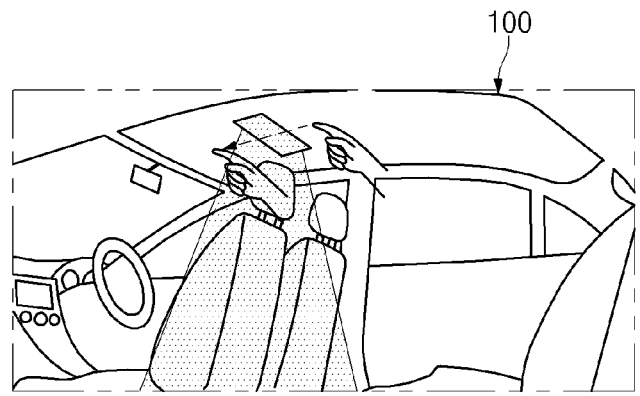
Figure 4C:
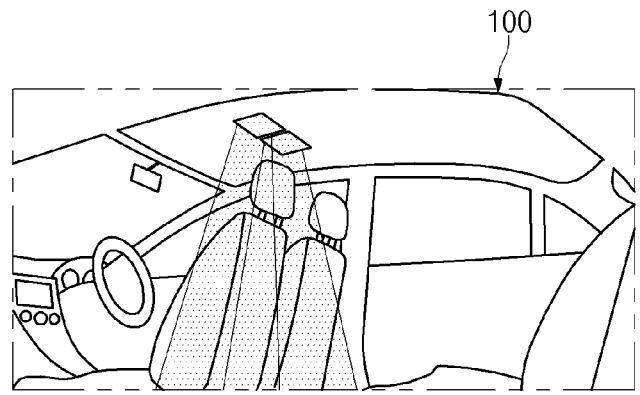

Further, as illustrated in FIGS. 4A to 4C, if a passenger draws a line on the organic EL touch portion 120 in the lighting area of the organic EL lighting portion 110 using his/her finger or tool, the lighting area of the organic EL lighting portion 110 is divided into two lighting areas around the drawn line.

On the other hand, if a passenger draws a plurality of lines on the organic EL touch portion 120 in the lighting area of the organic EL lighting portion 110 (e.g. in a zigzag manner) using his/her finger or a tool, the lighting area of the organic EL lighting portion 110 is divided into a plurality of lighting areas around the drawn lines, and the plurality lighting areas can be moved and adjusted as described above.

On the other hand, if a passenger clicks again the lighting area of the organic EL touch portion 120, the lighting area is removed to cut off the driving current that is supplied to the EL element, and the lighting of the organic EL lighting portion 110 thus disappears.

Hereinafter, in describing another embodiment according to the second embodiment of the present invention, similar reference numerals are given for similar constituent elements, and duplicate description thereof will be omitted.

Figure 5:
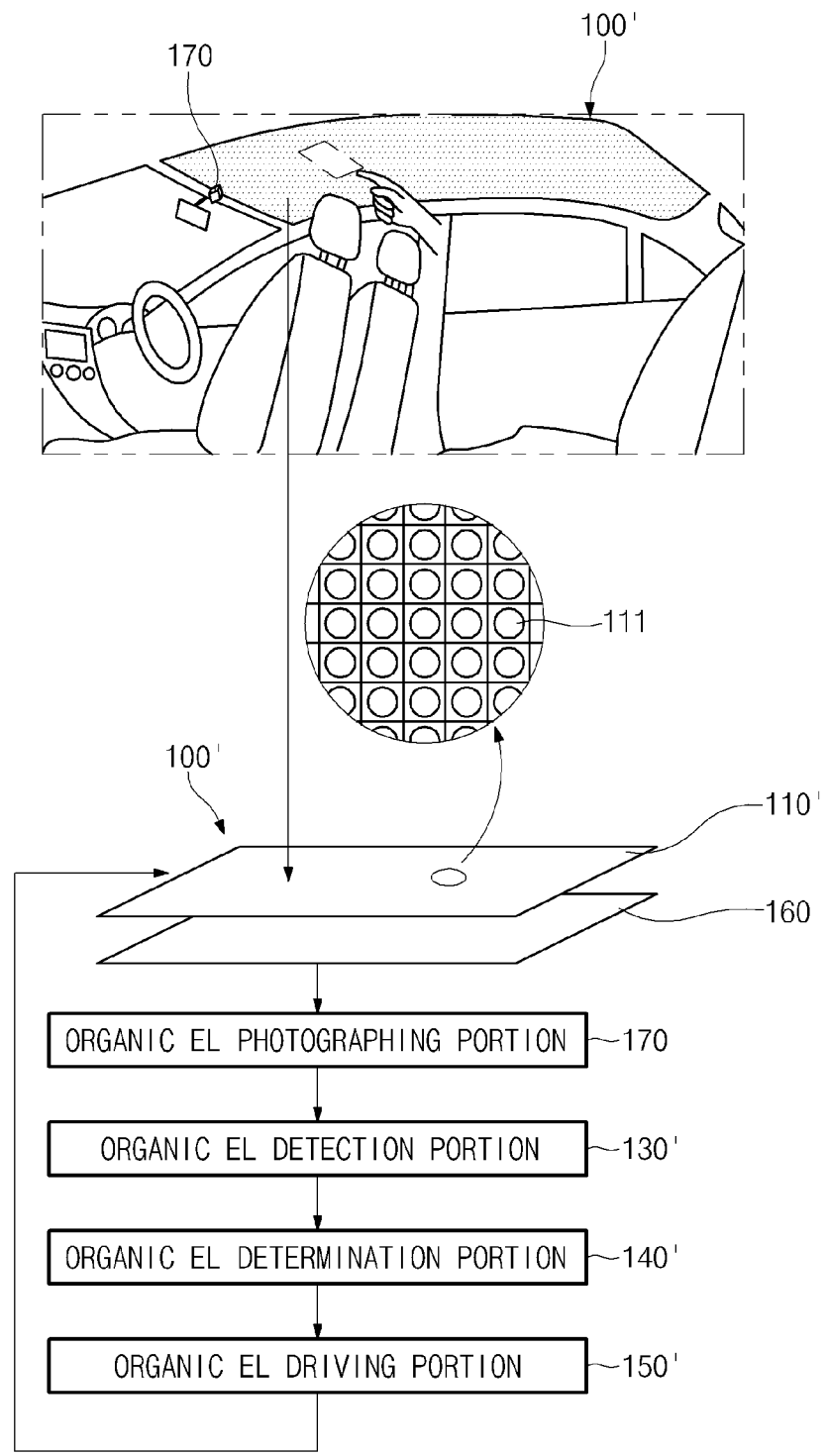
FIG. 5 is a view illustrating an organic EL lighting device for a vehicle according to a second embodiment of the present invention.

As illustrated in FIG. 5, an organic EL lighting device 100' for a vehicle according to a second embodiment of the present invention includes an organic EL lighting portion 110' arranged in a matrix form on a ceiling 10 of the vehicle, an organic EL photographing portion 170 provided on one side of the interior of the vehicle and configured to photograph a position in which the organic EL lighting portion 110' is touched, an organic EL detection portion 130' for detecting the touch position of the organic EL lighting portion 110' that is photographed by the organic EL photographing portion 170, an organic EL determination portion 140' for determining a lighting area through the position detected by the organic EL detection portion 130', and an organic EL driving portion 150' for lighting the lighting area as determined by the organic EL determination portion 140'.

Here, the configurations of the organic EL lighting portion 110', the organic EL detection portion 130', the organic EL determination portion 140', and the organic EL driving portion 150' are similar to the configurations of the organic EL lighting portion 110, the organic EL detection portion 130, the organic EL determination portion 140, and the organic EL driving portion 150 as described in connection with the first embodiment, and thus the detailed description thereof will be omitted.

In this embodiment, the organic EL photographing portion 170 can be a camera that photographs the position in which the organic EL lighting portion 110' is touched. In particular, the EL photographing portion 170 photographs in real time the position in which the organic EL light portion 110' is contacted, and transfers that position to the organic EL detection portion 130'.

Accordingly, the organic EL detection portion 130' detects a contact area based on the resultant position of the organic EL lighting portion 110' that is photographed by the organic EL photographing portion 170, and transfers the detected contact area to the organic EL determination portion 140'. The organic EL determination portion 140' determines the lighting area based on the contact area, and the organic EL driving portion 150' supplies driving current to the EL elements in the lighting area that has been determined by the organic EL determination portion 140' to thereby make those EL elements emit light. Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An organic EL lighting device for a vehicle comprising:
an organic EL lighting portion arranged in a matrix form on a ceiling of the vehicle;
an organic EL photographing portion provided on one side of an interior of the vehicle for photographing a position in which the organic EL lighting portion is touched;
an organic EL detection portion for detecting a touch position of the organic EL lighting portion that is photographed by the organic EL photographing portion;
an organic EL determination portion for determining a lighting area based on the position detected by the organic EL detection portion; and
an organic EL driving portion for lighting the lighting area determined by the organic EL determination portion.

2. The organic EL lighting device for a vehicle according to claim 1, wherein a transparent protection sheet is provided on a surface of the organic EL touch portion.

3. The organic EL lighting device for a vehicle according to claim 1, wherein the organic EL lighting portion comprises a plurality of organic EL elements arranged in a matrix form.

4. The organic EL lighting device for a vehicle according to claim 3, wherein the plurality of organic EL elements include a single color of organic EL elements which emit a corresponding color light to form a monochromatic light source, the single color selected from of blue, red, green, and yellow.

5. The organic EL lighting device for a vehicle according to claim 3, wherein the plurality of organic EL elements include two or more colors of organic EL elements which emit a corresponding color light to form a polychromatic light source, the two or more colors selected from blue, red, green, and yellow.

* * * * *